S. A. SCHEWCZIK.
SPRING TIRE FOR WHEELS.
APPLICATION FILED JAN. 26, 1909.
967,249.
Patented Aug. 16, 1910.
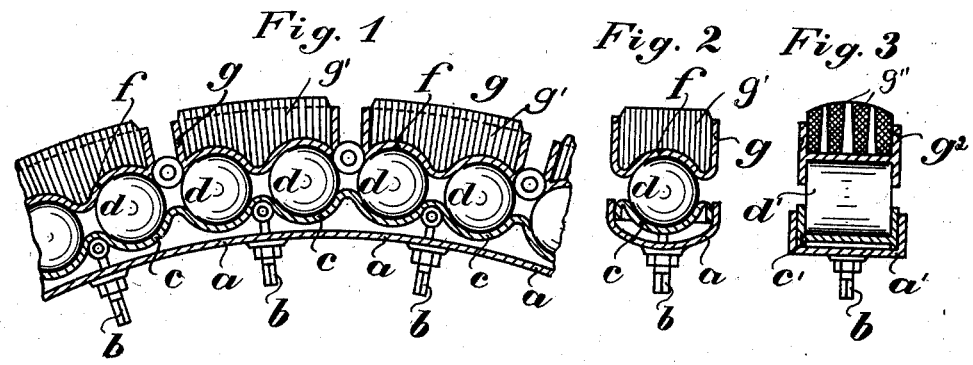
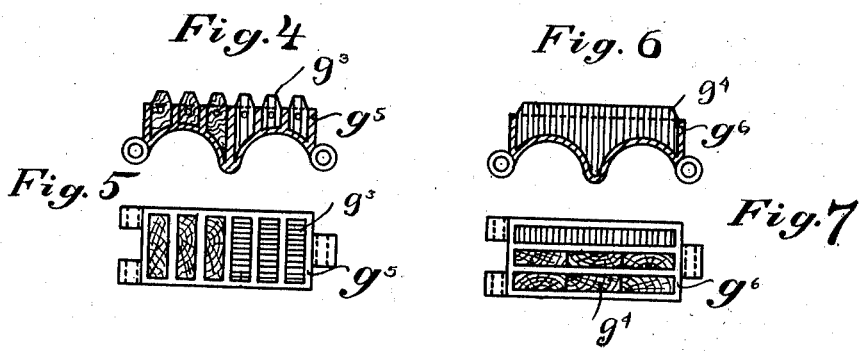
Witnesses
Janet M. Wynkoop,
Cora B. Melton.
Inventor
Silvio A. Schewczik
per
Knight Bros.
Attorneys

UNITED STATES PATENT OFFICE.

SILVIO A. SCHEWCZIK, OF VIENNA, AUSTRIA-HUNGARY.

SPRING-TIRE FOR WHEELS.

967,249.  Specification of Letters Patent. Patented Aug. 16, 1910.

Application filed January 26, 1909. Serial No. 474,220.

*To all whom it may concern:*

Be it known that I, SILVIO A. SCHEWCZIK, a subject of the Austro-Hungarian Emperor, residing at Vienna, Austria-Hungary, have invented certain new and useful Improvements in Spring-Tires for Wheels, of which the following is a specification.

The present invention relates to spring tires for vehicle wheels and has for its purpose to provide a tire which will serve all the advantages of the pneumatic tire and yet be free from the many disadvantages attending the use of the same.

Generally stated, the invention embodies a resilient or cushioning means interposed between the wheel felly and an outer rim or tread, thus removing such means from the wear to which the cushioning means is usually subjected, and the tread is of such structure as to retain the cushioning means in its proper position, and thus provide a smooth and even running surface for the wheel.

With these objects in view, my invention is shown in its preferred embodiment in the accompanying drawings, wherein—

Figure 1 is a longitudinal section of the invention, Fig. 2 is a transverse section of Fig. 1, Fig. 3 is a similar view showing a slight modification, Figs. 4 and 5 are respectively a longitudinal section and top plan view of a modified form of tread member, and, Figs. 6 and 7 are corresponding views of a further modification.

Referring to the different views in further detail and wherein like letters of reference indicate corresponding parts in the different views shown, $a$ designates a wheel felly or rim which is of substantially U-shape in cross section (see Figs. 2 and 3) and fitting within said rim and co-extensive therewith is a second rim or cushion retaining means $c$ which comprises a single sheet of metal provided with a plurality of semi-spherical depressions throughout its circumference. For holding said retaining rim $c$ in proper position relative to the rim $a$ there is provided a series of adjusting pins $b$ which are held to the rim $a$ in such manner as would permit radial adjustment thereon. Said series of adjusting pins $b$ are adapted to seat within the alternate grooves or depressions formed within the rim $c$.

Within the several depressions formed in the rim $c$ are seated the several balls $d$ whose structure is such as would give proper resiliency to the wheel. There are provided about the felly an even number of balls $d$ and each pair of said balls is adapted to support a tread member which in series constitute the outer rim of the wheel. The several tread members comprise each a link $g$ constructed of metal and are of such design on their under sides $f$ as to provide a complementary bearing surface or seat for the balls $d$. Each of said links is further provided with attaching means at its ends as shown whereby to interengage in a manner that will permit of relative movement between the several tread members to compensate for inequalities in the road over which the vehicle may be traveling. The structure of the links is such as to receive a wearing block $g'$ of any preferred material, such as leather, rubber, wood or the like. The substance of the block is arranged in a series of separate strips or sections disposed either transversely or longitudinally of the tread block, (see Figs. 5 and 7).

In lieu of the felly $a$ as employed in Fig. 1 the design of felly $a'$ shown in Fig. 3 may be used. In this instance the several other elements of the tire are correspondingly modified. Thus the retainer rim $c'$ is of a design that will permit its reception within said felly $a'$. The cushioning means comprises a plurality of rubber cylinders $d'$ arranged in substantially the manner shown in Fig. 1, and each pair of which supports a tread retaining link $g^2$. The wearing surface $g''$ for each of the links $g^2$ may likewise be of the same material employed in the type of tread shown in the figures above described.

In the structure shown in Figs. 4 and 5, the tread links $g^5$ have the wearing surface thereof in the form of blocks $g^3$ disposed transversely of the links. And in that structure shown in Figs. 6 and 7, the links $g^6$ have the blocks $g^4$ disposed lengthwise of the links.

Having thus described the invention, what is claimed as new, is:—

1. In a wheel-tire, the combination with the felly, of a cushion retaining means, said means comprising a single sheet of metal having a plurality of semi-spherical depressions circumferentially disposed therein, cushioning members seated within said recesses, and a plurality of directly connected tread members having their under faces designed complementary to the cushioning members.

2. In a wheel-tire, the combination with the felly, of a cushion retaining means therefor, said means comprising a ring of a single sheet of metal having a plurality of semi-spherical depressions therein, means engaging intermediate said depressed portions for adjustably supporting said ring upon the wheel felly, cushioning members of spherical design seated within the depressions of the cushion retaining means, and a tread comprising a plurality of connected members each of which members has its under side designed with semi-spherical depressions adapted to receive said cushioning means.

3. In a wheel-tire, the combination with the felly, of a cushion retaining means adjustably supported thereon and provided with a plurality of depressions, said adjusting means comprising pins carried by the wheel felly and seated within the grooves formed by the depressed portions, cushioning members seated within said depressed portions, a wheel tread comprising a plurality of connected members having their under faces provided with depressions adapted to receive said cushioning members, and a tread substance carried by the individual members constituting the wheel tread.

SILVIO A. SCHEWCZIK.

Witnesses:
ROBERT W. HEINGARTNER,
ALEXANDER WITTE.